May 19, 1931.  V. A. BOKER  1,806,278
LUBRICATOR COUPLING MEANS
Filed May 4, 1929
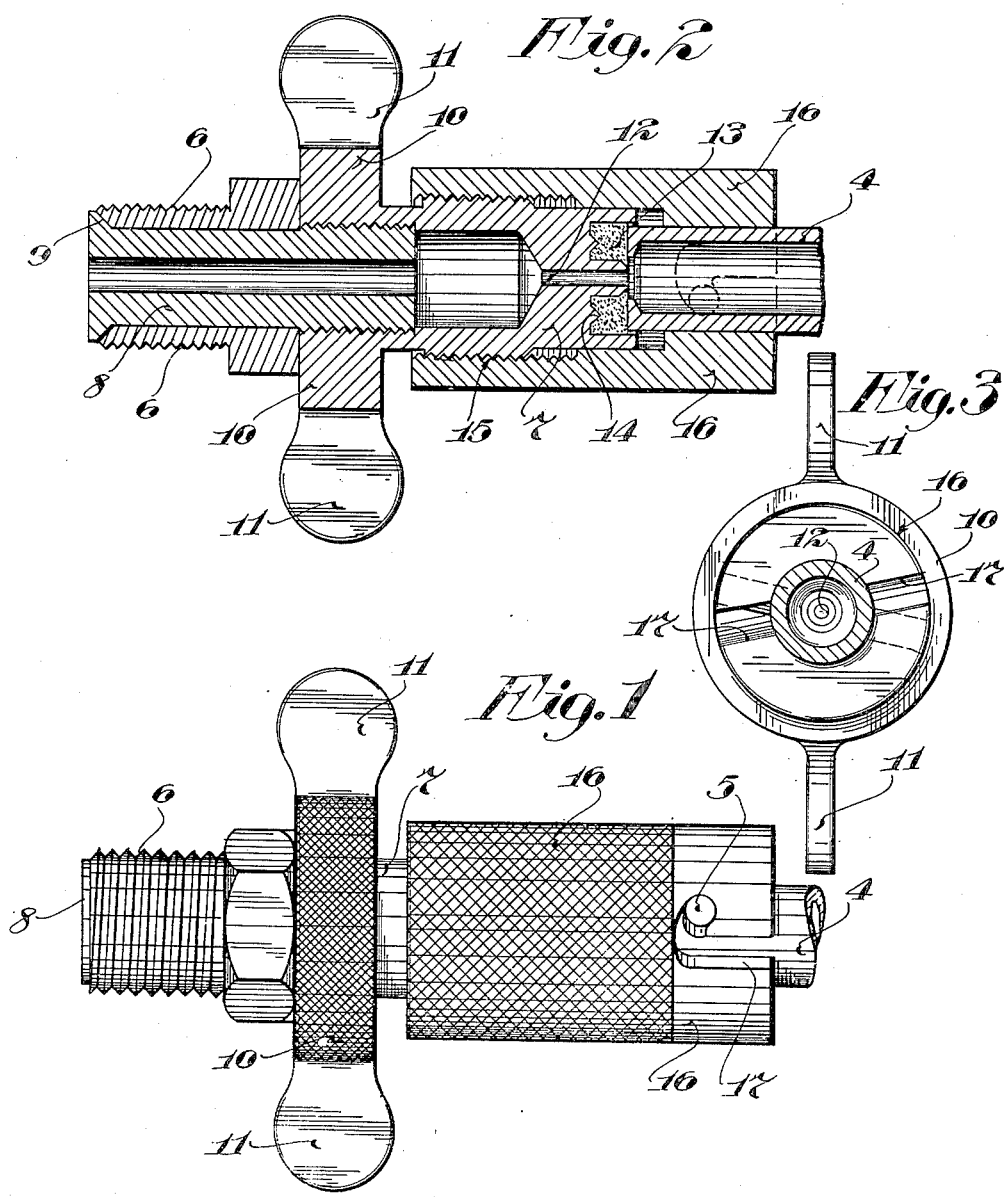

Patented May 19, 1931

1,806,278

UNITED STATES PATENT OFFICE

VITUS A. BOKER, OF MINNEAPOLIS, MINNESOTA, ASSIGNOR TO MIN-A-MAX CO., OF MINNEAPOLIS, MINNESOTA, A CORPORATION OF MINNESOTA

LUBRICATOR COUPLING MEANS

Application filed May 4, 1929. Serial No. 360,528.

This invention relates to lubricating systems such as are especially useful in lubricating the various parts of automobiles, and provides an improve means for coupling the grease delivery pipes to the receiving nipples for the delivery of grease to the latter under high pressure.

Generally stated, the invention consists of the novel devices, combinations of devices and arrangement of parts hereinafter described and defined in the claims.

In the accompanying drawings, which illustrate a commercial form of the invention, like characters indicate like parts throughout the several views.

Referring to the drawings:

Fig. 1 is a plan view illustrating the invention;

Fig. 2 is an axial section of the parts shown in Fig. 1; and

Fig. 3 is an end elevation of the parts shown in Fig. 2 looking at the same from the right toward the left in respect to said view.

The numeral 4 indicates a grease-receiving nipple provided with diametrically projecting lock pins or lugs 5. This nipple, parts of which are broken away in Figs. 1 and 2, will be assumed to be one of the several receiving nipples applied to the various parts of an automobile that are to be lubricated and in itself constitutes no part of the present invention.

The numeral 6 indicates a sleeve-like terminal member of a grease pipe such, for example, as that disclosed and claimed in my co-pending application, S. N. 178,308, filed March 25, 1927, entitled "Jointed grease pipe". The numeral 7 indicates a tubular grease discharge nozzle which has a contracted tubular stem 8 that is swivelled in the grease pipe terminal 6 and has a beveled pressure-seated joint therewith at 9. As shown, the body 7 and stem 8 of this nozzle have threaded engagement at 10, the threads of the former being shrunk onto the latter so that the two members 7 and 8 act as one member swivelled to the terminal member 6. To facilitate rotation of the nozzle, it is provided with projecting ears or thumb-pieces 11.

At its delivery end, the nozzle 7 is formed with a contracted axial discharge passage 12 and surrounding the same it is provided with an inset annular gasket 13 preferably of leather, but possibly of other material such as lead, which will yield only sufficiently to form a grease-tight joint with the receiving end of the nipple 4. The bottom of the seat that receives the gasket 13 is preferably formed with an annular rib 14 that is V-shaped in cross-section so that it cuts into the gasket 12 and greatly assists in preventing leakage of lubricant around and under the gasket 13. Advisably, the outer face of the gasket is slightly inward of the extreme outer end of the nozzle 7 so that there can never be any overflowing of the gasket outward of the end of the nozzle.

The intermediate portion of the nozzle 7 is externally threaded at 15 and screwed onto the same is a tubular coupling head or sleeve 16. Outward of the end of the nozzle 7, coupling head 16 has a slightly contracted passage of a size adapted to quite freely fit over the nipple 4 to guide the receiving end of said nipple into proper engagement with the gasket 13. At its projecting end, coupling head 16 is formed with bayonet slots 19 for interlocking engagement with the lugs 5 on the nipple. It will be noted that the offset inner extremities of the slots 17 are slightly outturned so that when they are engaged with the lugs 5, coupling head will be locked to the nipple against rotation.

The manner of applying the device to the nipple is very simple, to wit: by rotation of the nozzle 7—8. In one direction the sleeve-like coupling head 16 will be axially projected while by rotation in the opposite direction, said member 16 will be drawn axially toward the sleeve 6. While the coupling head 16 is projected, its bayonet slots 17 will be interlocked with the nipple lugs 5 and then by rotation of said nozzle 7—8, the end of the nipple may be so tightly seated against the gasket 13 that leakage of oil even under very high pressure will not take place between the nipple and nozzle. In this device, it is evident that internal pressure of the grease tends to produce a leakage between the nipple and the gasket and that leakage is prevented solely by clamping pressure produced between the two. Otherwise stated, there is no self-sealing action between the nipple and the gasket.

In actual practice, this device has been found to be highly efficient for the purposes had in view.

What I claim is:

1. The combination with the terminal member of a grease pipe, of a nozzle having a stem swivelled in said terminal member, said nozzle at its extended end having an axial delivery passage and a surrounding inset annular gasket set directly and solidly into said nozzle, and a sleeve-like coupling head having threaded engagement with said nozzle and provided with bayonet slots adapted to engage projecting lugs on a nipple for interlocking engagement therewith, whereby rotation of said nozzle will clamp the end of said nipple against the gasket of said nozzle.

2. The structure defined in claim 1 in which said sleeve-like coupling head at its outer end is formed with an axial passage arranged to guide the nipple into proper engagement with said gasket.

In testimony whereof I affix my signature.

VITUS A. BOKER.